US012559898B2

(12) United States Patent　　　　(10) Patent No.:　US 12,559,898 B2
Almy　　　　　　　　　　　　　　(45) Date of Patent:　Feb. 24, 2026

(54) PASSIVE LOCKING CHUCK FOR ROTARY DRIVER

(71) Applicant: Ojjo, Inc., San Rafael, CA (US)

(72) Inventor: Charles Almy, Berkeley, CA (US)

(73) Assignee: Ojjo, Inc., San Rafael, CA (US)

( * ) Notice: Subject to any disclaimer, the term of this patent is extended or adjusted under 35 U.S.C. 154(b) by 573 days.

(21) Appl. No.: 17/850,851

(22) Filed: Jun. 27, 2022

(65) Prior Publication Data

US 2023/0121321 A1　Apr. 20, 2023

Related U.S. Application Data

(60) Provisional application No. 63/181,046, filed on Apr. 28, 2021.

(51) Int. Cl.
E02D 7/22　　　(2006.01)
B23B 31/103　　(2006.01)
F24S 25/617　　(2018.01)

(52) U.S. Cl.
CPC .............. E02D 7/22 (2013.01); B23B 31/103 (2013.01); F24S 25/617 (2018.05)

(58) Field of Classification Search
CPC ......... B23B 31/103; B23B 31/18; E02D 7/22; F24S 25/617; Y10S 279/906; Y10T 279/17153; Y10T 279/17162; Y10T 279/17231
See application file for complete search history.

(56) References Cited

U.S. PATENT DOCUMENTS

| | | | | |
|---|---|---|---|---|
| 1,449,454 | A | * | 3/1923 | Smith ..................... B23B 31/18 |
| | | | | 279/51 |
| 2,012,280 | A | * | 8/1935 | Johansen .................. E21B 3/04 |
| | | | | 175/414 |
| 2,251,470 | A | * | 8/1941 | Stacey ................... A43D 87/00 |
| | | | | 279/2.18 |
| 2,405,018 | A | * | 7/1946 | Crowley ............... B21D 51/36 |
| | | | | 279/43.7 |
| 3,043,614 | A | * | 7/1962 | Eichmann ............... B64D 1/06 |
| | | | | 403/321 |
| 4,786,063 | A | * | 11/1988 | Engelhardt .............. B25B 5/14 |
| | | | | 279/35 |

FOREIGN PATENT DOCUMENTS

GB　　　　575009　A　*　1/1946　............. B65H 51/14

* cited by examiner

*Primary Examiner* — Eric A. Gates
(74) *Attorney, Agent, or Firm* — Fredrikson & Byron, P.A.

(57)　　　　　ABSTRACT

A passive locking chuck for a rotary driver. The chuck receives the driving end of a foundation component such a screw anchor to be driven into the ground. As the driving end is inserted into the chuck, spring biased pawls are displaced until insertion is complete. The geometry of each pawl dictates that less force is required to insert the foundation component than to remove it. The chuck has a geometry that mates with the geometry of the driving end of the foundation component.

16 Claims, 9 Drawing Sheets

PASSIVE LOCKING CHUCK FOR ROTARY DRIVER

CROSS-REFERENCE TO RELATED APPLICATIONS

This claims priority to U.S. provisional patent application No. 63/181,046 filed on Apr. 28, 2021, titled "Passive locking chuck assembly for rotary driver," the disclosure of which is hereby incorporated by reference in its entirety.

BACKGROUND

The sun is one of Earth's largest potential sources of energy. Above the atmosphere, solar irradiance per unit area is 1.361 kilowatts per square meter. At sea level, the usable energy density is reduced to 250 watts per square meter, still a staggering large number. Using a two-dimensional model to approximate the Earth, 250 watts/square meter*$\pi$*6,371, 000 meters$^2$ yields about 32,000 terra (trillion) watts of energy that continuously strikes Earth's surface. Assuming the sun continues to burn and emit photons for a billion more years, the survival of human life ultimately depends on harnessing this essentially unlimited, source of clean energy.

The main impediment to widescale solar adoption thus far has been cost. Unlike other energy sources, solar energy costs are almost entirely upfront; operating costs over the life of the system are comparatively low relative to other energy sources. Conventional fossil fuel-based energy sources require significant up-front costs as well as pay-as-you-go costs from consuming fuel. Unfortunately, not all the ongoing costs are reflected in the price of energy generated from fossil-fuel sources. These "dirty" energy sources have significant external costs stemming from $CO_2$ emissions that, in the absence of a carbon tax, are continue over the life of the fossil-fuel power plant but are not reflected in the cost. Entrenched fossil fuel utilities and producers have also lobbied effectively to stymie the progress of solar, even in states with the greatest solar potential, increasing the headwinds faced by solar energy.

Notwithstanding these headwinds, the cost of solar has now dropped low enough that even when coupled with energy storage, it is equivalent to or less expensive than coal, oil, and even natural gas. In the context of the electricity market, the relative cost difference between competing sources is quantified in terms of the cost per unit, typically a kilowatt hour (kWh). Large scale solar arrays, so called "utility-scale" arrays, may have tens to hundreds of megawatts of power generating capacity, putting them on the same scale as small coal and natural gas-fueled power plants. These arrays usually generate power that is fed into the grid and sold at wholesale prices on the order of a few cents up to ten cents per kWh. The development of utility-scale solar projects is funded with so-called power purchase agreements (PPAs). With a PPA, an off taker (e.g., utility, grid operator, etc.) agrees to purchase all the power generated by the system at a fixed rate for the operational life of the array (e.g., 30 years). This enables a bank or other investor to accurately value the predicted future stream and to loan money against it to finance construction of the array with a tangible risk factor.

In the United States, utility-scale solar power plants are predominantly configured as fixed-tilt ground mounted arrays or single-axis trackers. Fixed-tilt arrays are arranged in East-West oriented rows of panels tilted South at an angle dictated by the latitude of the array site—the further away from the equator, the steeper the tilt angle. By contrast, single-axis trackers are installed in North-South rows with the solar panels attached to a rotating axis called a torque tube that move the panels from an East-facing orientation to a West-facing orientation throughout the course of each day, following the sun's progression through the sky. Single-axis trackers may also be arranged in rows that are angled towards the equator (i.e., South). For purposes of this disclosure, both fixed-tilt and single-axis trackers are referred to collectively as axial solar arrays.

Excluding land acquisitions costs, overall project costs for utility-scale arrays may include site preparation (road building, leveling, grid and water connections etc.), foundations, tracker or fixed-tilt hardware, solar panels, inverters, and electrical connections (conduit, wiring, trenching, combiner boxes, grid interface infrastructure, etc.). While many of these costs have come down over the past few years due to ongoing innovation and economies of scale, however, one area that has been largely ignored is foundations. Foundations provide a uniform structural interface that couples the system to the ground. When installing a conventional single-axis tracker, after the site has been prepared, plumb mono-piles are driven into the ground at regular intervals dictated by the tracker manufacturer and site plan; the tracker system components are subsequently attached to the head of those monopiles piles. Most often, the piles used to support the tracker have an H-shaped profile, but they may also be C-shaped or even box-shaped. In conventional, large-scale single-axis tracker arrays, the procurement and construction of the foundations may represent up to 5-10 percent of the total system cost. Despite this relatively small share of the total cost, any savings in steel and labor associated with foundations will amount to a significant amount of money over a large, multi-gigawatt portfolio of solar projects. Also, tracker development deals are often locked-in a year or more before the installation costs are actually incurred, therefore, any post-deal savings that can be realized will be on top of the profits already factored in to calculations that supported financing of the project's construction.

One reason monopiles have dominated the market for single-axis tracker foundations is their simplicity. Assuming the soil permits, it is relatively easy to drive monopiles into the ground along a straight line with existing technology even though the design is inherently wasteful. The way that a driven monopile resists forces in generated by a single-axis tracker mandates that it be oversized because single structural members are not good at resisting bending forces. When used to support a single-axis tracker, the largest forces on the foundation are not vertical from the weight of the components but rather due to the combined lateral force of wind striking the solar panels across a single torque tube. This lateral force gets translated into a monopile foundation as a bending moment. The magnitude of the force is much greater than the static loading attributable to the weight of the panels and tracker components. =In fact, it acts like a lever arm trying to bend the pile; the longer the lever arm, the greater the magnitude of the force. Many tracker companies specify a minimum foundation height of 40-inches or more, therefore, in the context of single-axis trackers, monopile foundations must be significantly oversized relative to the size required to support their weight and driven relatively more deeply into the ground to withstand combined lateral wind loads.

One proposed alternative to monopile foundations is to use a pair of steeply angled legs to form an A-frame or truss-like foundation. An A-frame has the advantage of converting lateral loads into axial forces of tension and compression in the legs. This is seen, for example, in published U.S. Patent Application, 2018/0051915 (herein after, "the '915 application"). The '915 application teaches a support device for solar panels that consists of a pair of ground screws driven into the ground either parallel to one another or at steep angles to one another and joined above ground with a bridge. According to the disclosure, in the angled embodiments, the legs are inclined towards one another at an angle that is preferably between 10 and 35-degrees, and more preferably between 15 and 25-de-grees. That angle is the separation of the legs at the apex of the A-frame and corresponds to a leg angle in a range of ±72.5-degrees to ±85-degrees and more preferably ±78.5-degrees to ±82.5-degrees with respect to horizontal.

As discussed in greater detail herein, such steep angles, while still capable of translating lateral loads into tension and compression, will result in tensile and compressive forces much larger than the underlying lateral load. The magnitude of the tensile and compressive forces generated by lateral loads is non-linearly correlated to leg angle, a fact that is not recognized by the teaching of the '915 applica-tion. As a result, at such steep angles, the legs must be oversized or include additional orthogonal features to resist the large values of tension and compression that are gener-ated.

In recognition of this problem, it is an object of various embodiments of this disclosure to provide an A-frame-shaped truss foundation for single-axis trackers that is limited to a range of angles that reduces the non-linear magnitude of tensile and compressive forces imparted to the truss from lateral loads and thereby optimizes the amount of steel and depth of embedment needed for a given diameter leg.

The applicant of this disclosure has developed a new and useful foundation system for supporting single-axis solar trackers among other structures. Known commercially as Earth Truss, the system consists of a pair of adjacent legs extending separately below ground and joined above ground with a truss cap or other adapter to form an A-shaped truss. Each leg of the Earth Truss consists of a below ground, screw anchor component and an above-ground upper leg portion that are joined by sleeving the latter over a driving coupler at the upper end of the screw anchor. Crimp con-nections are used to join the truss cap to the upper legs and the upper legs to the screw anchors avoiding the need for additional tools or expensive third-party fasteners. In some cases, the driving coupler has a ring of driving features circumscribing it and a narrower projection extending above the ring. The ring is engaged by the chuck of a rotary driver to enable torque and downforce to be transferred to the screw anchor so that it embeds in the underlying ground. The projection is received in the shaft of the upper leg portion and provides a surface to crimp the upper leg against.

The machine used to install and assemble this system, known commercially as a truss driver, has rotary driver that travels along an articulating mast to drive pair of adjacent screw angles into the ground at complementary to angles to one another so that a line through center axis points at a substantially common point in space. Before driving can begin, an operator must load a screw anchor into the chuck of the rotary driver. The anchor may weigh between 10 and 20 pounds and therefore must be held in the chuck with something other than friction to prevent it from falling out before resistance from the ground begins. In the past, one or more pins have been passed through the chuck and the component to hold the two together. This solution is less than ideal because it involves extra steps and if the operator forgets to remove the pin after the component has been driven, withdrawal of the rotary driver up the mast will pull the driven screw anchor back out. Therefore, various embodiments of this disclosure are directed to passive locking chucks that will hold a screw anchor in place while allowing the chuck to disengage without affecting the driven screw anchor.

DETAILED DESCRIPTION

The following description is intended to convey a thor-ough understanding of the embodiments described by pro-viding a number of specific embodiments and details involv-ing chucks for rotary drivers of screw anchor driving and assembly machines for utility-scale solar foundation com-ponents. It should be appreciated, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon spe-cific design and other needs.

Figure 1:
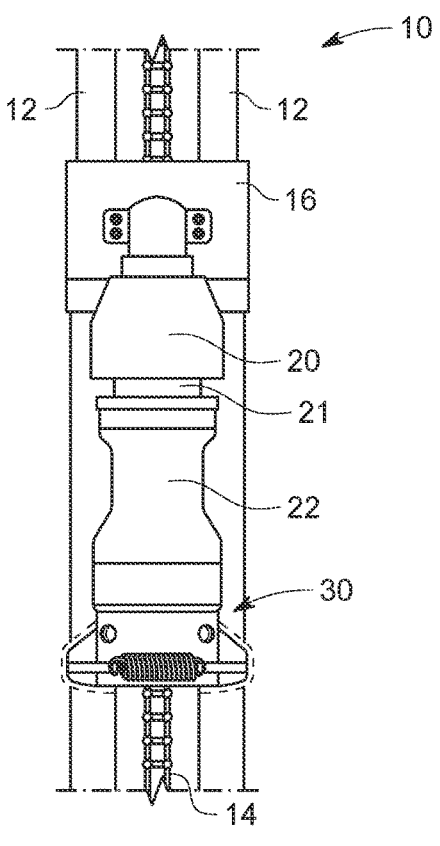
FIG. 1 shows a portion of a rotary driver and mast for a screw anchor driving machine according to various embodi-ments.
Figure 2A:
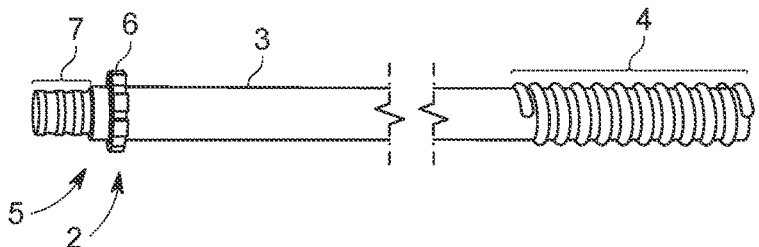
FIGS. 2A and 2B show a side and top view of a screw anchor foundation component according to various embodi-ments.
Figure 2B:
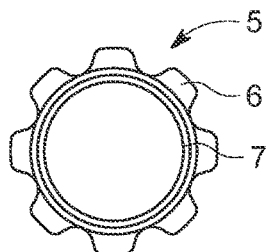

Turning now to the drawing figures, FIG. 1 shows a portion of mast 10 of a machine for driving Earth Truss components into the ground. Mast 10 is an elongated boxed steel structure extending 20 or more feet in length with a pair of rails 12 on the front or outer side, that is, opposite to the side of the mast connected to the machine. Details of the machine have been intentionally omitted here but may be found in commonly assigned U.S. Pat. No. 11,015,635 hereby incorporated by reference in its entirety. Drive chain 14 may be a heavy-duty single or multi-link chain extending substantially the entire length of mast 10. A hydraulic crowd motor (not shown) near the base of mast 10 applies force to drive chain 14. Lower crowd 16 is connected to drive chain 14 and moves up and down mast 10 with movement of the chain. Rotary driver 20 is attached to lower crowd 16 enabling it to impart downforce as well as torque to a foundation component as its being driven. Rotary driver 20 may be a hydraulic rotary driver such as those known in the art, with an output 21, adapter 22, and chuck 30. Chuck 30 is specially adapted to drive Earth Truss foundation components such as screw anchor 2 shown in FIGS. 2A and 2B.

Screw anchor 2, as shown, is an elongated steel tube with a shaft 3 and external thread form 4 at the lower end. Thread form 4 engages the soil as the anchor is rotated into the ground substantially increasing the anchor's resistance to axial forces of tension and compression. At the upper end of shaft 3 sits driving coupler 5. In various embodiments, driving coupler 5 may be welded onto the end of shaft 3. Coupler 5 may have a recess that receives the upper end of shaft 3 prior to welding. As shown, coupler 5 has a ring of driving features or teeth 6 extending radially outward from the coupler's body. These are shown more clearly in FIG. 2B. In various embodiments, they are distributed evenly around the perimeter of coupler 5 so that there is no specific orientation to them. Coupling portion 7 extends above ring 6. In various embodiments, this portion is received within an upper leg section consisting of a section of steel tube. In some embodiments, a hydraulic crimper is used to lock the upper leg to screw anchor 2 by crimping the upper leg over coupling portion 7. Recesses circumscribing coupling portion 7 provide a void for the upper leg to deform into when it is crimped. Because they circle the entire coupling portion, there is no specific orientation between the upper leg and coupler 5.

Turning now to FIGS. 3A-3D, these figures show different views of passive locking chuck 30 according to various embodiments of this disclosure. Chuck 30 has a cast, forged, or milled main body portion 32 with mounting portion 33 on its upper end. As shown, mounting portion 33 is a configured as a ring with a flat upper surface and a series of holes spaced around this surface, in the example of FIG. 3A there eight holes but any number of holes may be used. In various embodiments, these holes will spatially overlap with corresponding holes on an adapter connected to the output of the rotary driver, such as, for example, adapter 22 shown in FIG. 1 to enable screws, bolts, or other suitable fasteners to join the two components and to allow for easy removal for servicing or replacement. Alternatively, these holes may enable the chuck to be attached directly to the rotary driver. In still further alternative, mounting surface 33 may have a different geometry suitable for mounting to a rotary driver or adapter. As shown, a pair of spring biased pawls 34 circumscribe portions of the lower end of main body 32. In various embodiments, and as shown in the exemplary figures, pawls 34 may be hinged to main body 32 via a pair of screws 42 that pass through main body 32 and opening 38 formed in each pawl 34. In various embodiments, hooked portion 35 at the opposing end of each pawl 34 retains one end of a pair of opposing springs 40 that bias the pawls against main body 32; displacement of each pawl pulls against this bias. In addition to the portion that surrounds main body 32, pawls 34 may also have a curved displacement portion 36, as shown in the figures, that terminates in flat ledge 37. When a foundation component, such as screw anchor 2, is inserted into opening 31 in the lower end of chuck 30, ring of teeth or other features 6 fits into reciprocal notches 39 formed in the lower end. As shown in the figures, two of notches 39 are blocked by displacement portions 36 of respective opposing pawls 34. As ring 6 of component 2 presses against these portions 36, pawls 34 are forced outward, pivoting about hinge point 38, i.e., about bolt 42, pulling apart springs 40 and enabling ring 6 to fit within chuck 30. This continues until the bottom of ring 6 clears displacement portion 36 of each pawl and sits against ledge 37 with the teeth of ring 6 within notches 39. In various embodiments, the force required to insert screw anchor 2, that is, to move displacement portions 36 out of the way to enable the foundation component (e.g., screw anchor) to be loaded into the chuck is substantially less than the force required to remove it. Removing it requires ring 6 to press against ledge 37 until pawls 34 are maximally pivoted outward. In some cases, this may be as much as ten times the force required to displace the pawls when inserting the screw anchor because the geometry of the pawl dictates that the direction of the downward force is not aligned with the direction of the spring's displacement. For example, only ten to fifteen pounds of force may be required to insert a screw anchor into the chuck since the curved surface of displacement portion 36 substantially aligns the force with the direction of spring displacement, but 100 pounds of force may be required to remove it because only a fraction of this force is in the direction of displacement. After the screw anchor has been successfully driven to the desired embedment depth, retraction of the rotary driver up the mast, and/or upward movement of the mast, both of which are controlled by hydraulic power, will easily separate passive locking chuck 30 from coupler 5 of the driven screw anchor, without disturbing the embedment strength of the anchor which should be on the order of thousands of pounds even though a human would struggle to do so. Because the screw anchor only weights between 10 and 20 pounds in most cases, it is very unlikely that the screw anchor will accidentally disengage from the chuck prior to commencement of the driving operation. In fact, Applicant has not seen premature ejection while using the passive locking chuck according to various embodiments occur even once in tens of thousands of successful screw anchor driving operations.

Figure 3A:
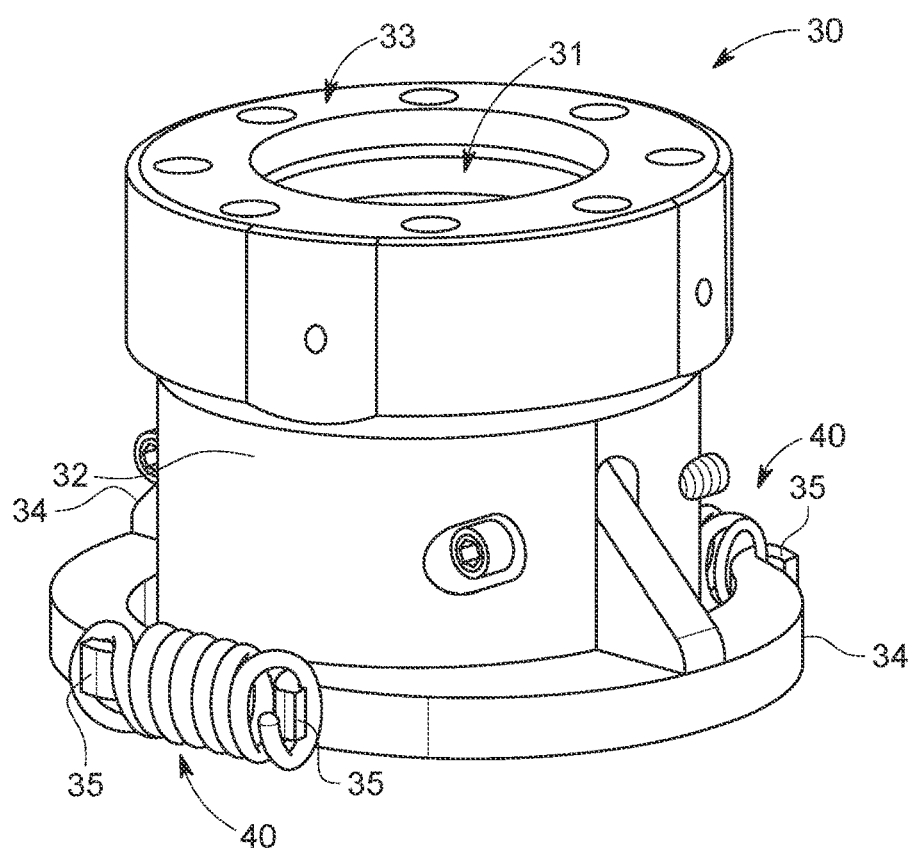
FIG. 3A is a perspective view of a passive locking chuck for a rotary driver according to various embodiments.
Figure 3B:
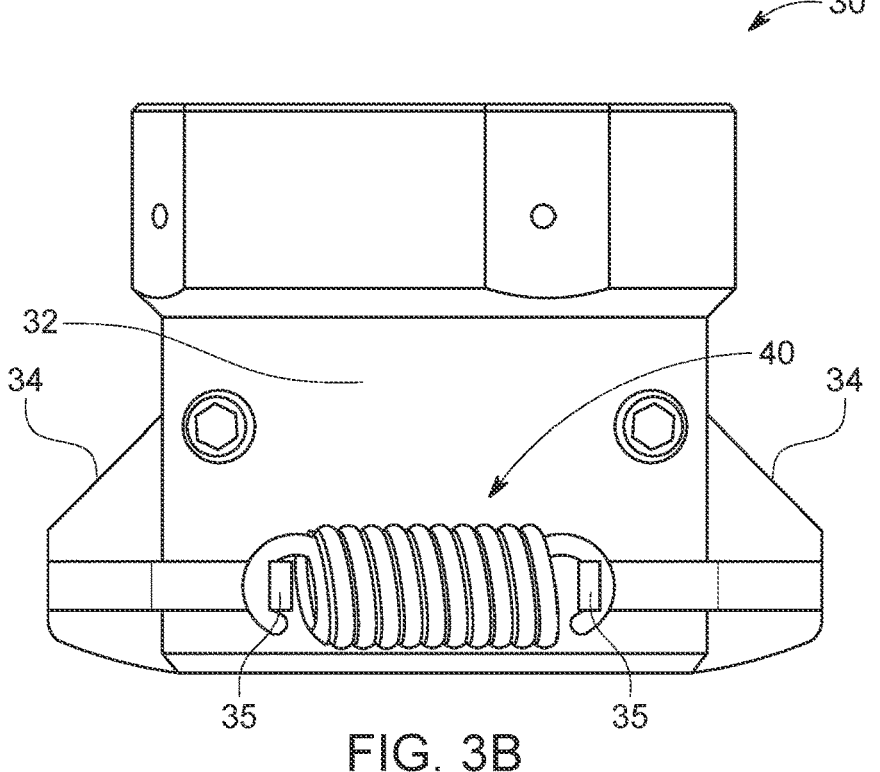
FIG. 3B is a side view of a passive locking chuck for a rotary driver according to various embodiments.
Figure 3C:
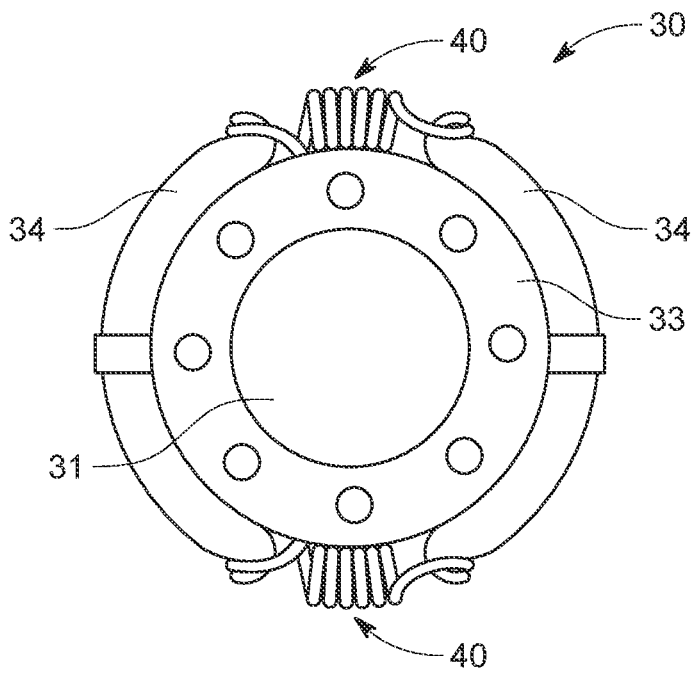
FIG. 3C is a top view of a passive locking chuck for a rotary driver according to various embodiments.
Figure 3D:
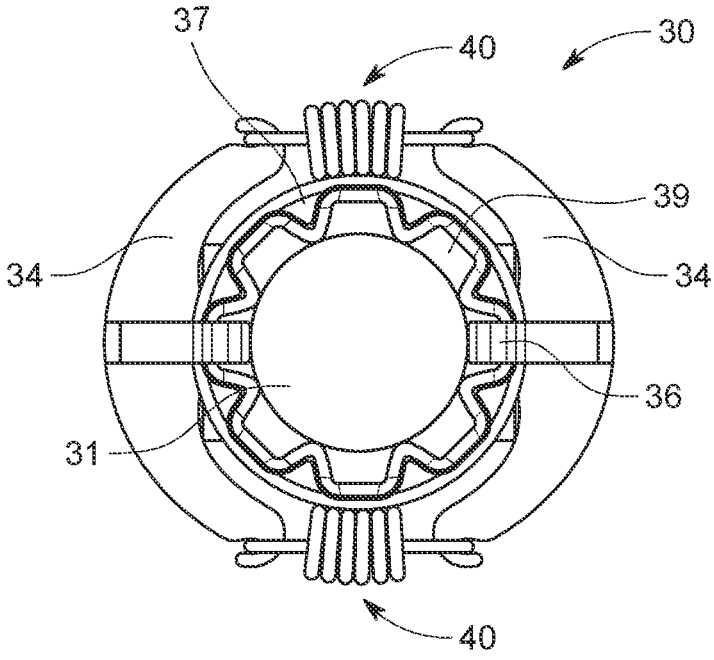
FIG. 3D is a bottom view of a passive locking chuck for a rotary driver according to various embodiments.

FIGS. 3C and 3D show top views and bottom views respectively of passive locking chuck 30 according to various embodiments of the disclosure. As shown in the figures a central passage marked as passage 31 passes through the entire main body of chuck 30. In various embodiments, this permits a tool such a drill rod or mandrel attached to a hydraulic drifter or other drilling device traveling on the same mast to pass through the rotary driver, locking chuck, and attached screw anchor to assist with embedment while the rotary driver is driving a screw anchor into the ground. On the underside, displacement portion 36 of each pawl 34 blocks two opposing recesses 39 of the opening. When the screw anchor or other foundation component is inserted into the chuck, the ring of driving features must displace these portions 36 to fit into recesses 39. As this happens, pressure applied by the person loading the screw anchor pushes against displacement portions 36 causing the pawls to pivot outward. The curved geometry of the displacement portion insures that the force against it by the screw anchor is substantially aligned with the direction the springs are displaced meaning that relatively less pressure is required to insert the screw anchor than to remove it. Once the displacement portion has been cleared and ring 6 rests on the ledge 37 the pawls retract to their relaxed position where the springs are not fully stretched; subsequent removal of the screw anchor requires pushing down on the ledge. The direction of this force when pulling down on the screw anchor is nearly orthogonal to the direction required to displace springs 40 and therefore a much larger force is required for removal than for insertion.

Figure 4:
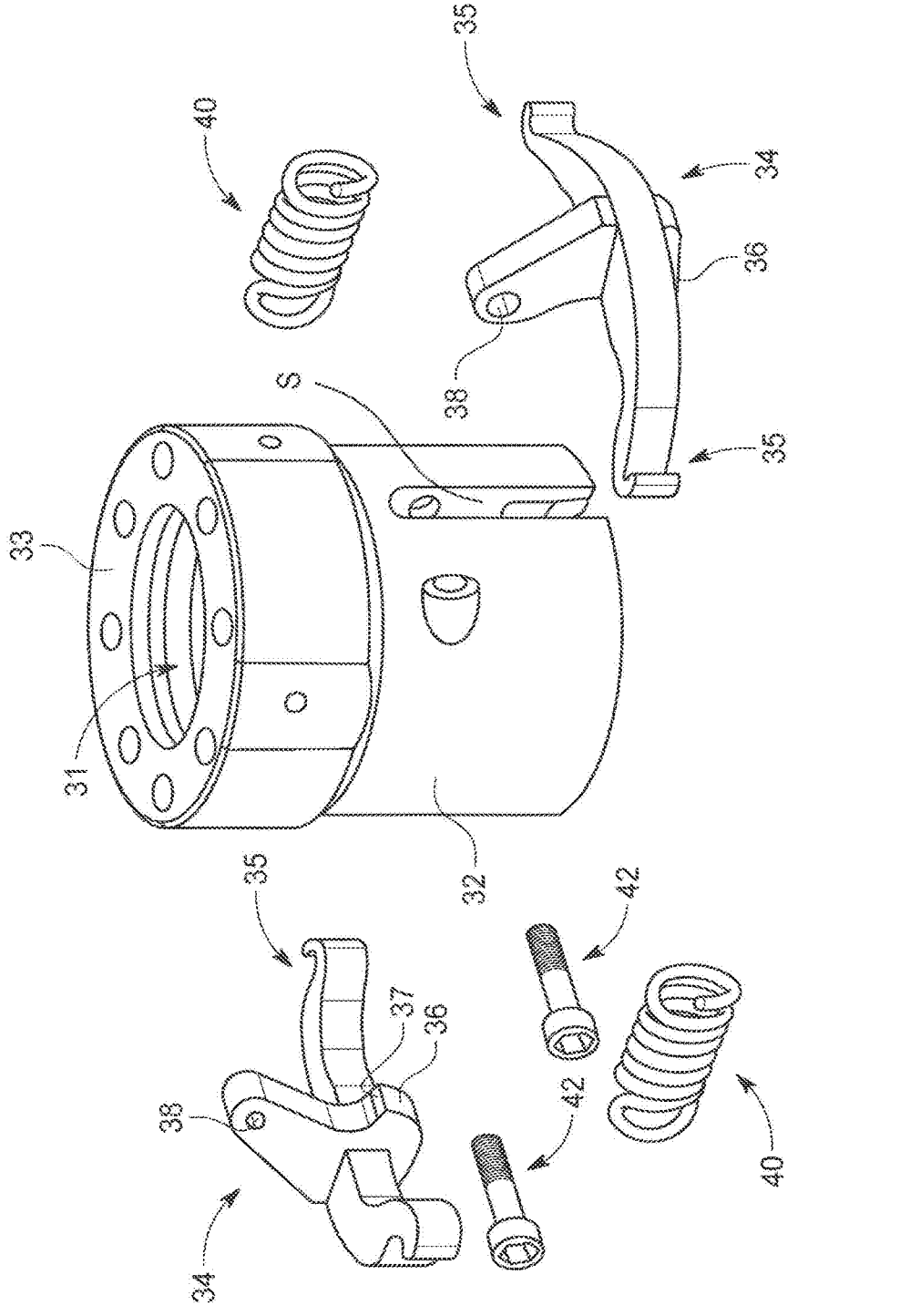
FIG. 4 is an exploded view of a passive locking chuck for a rotary driver according to various embodiments.
Figure 5A:
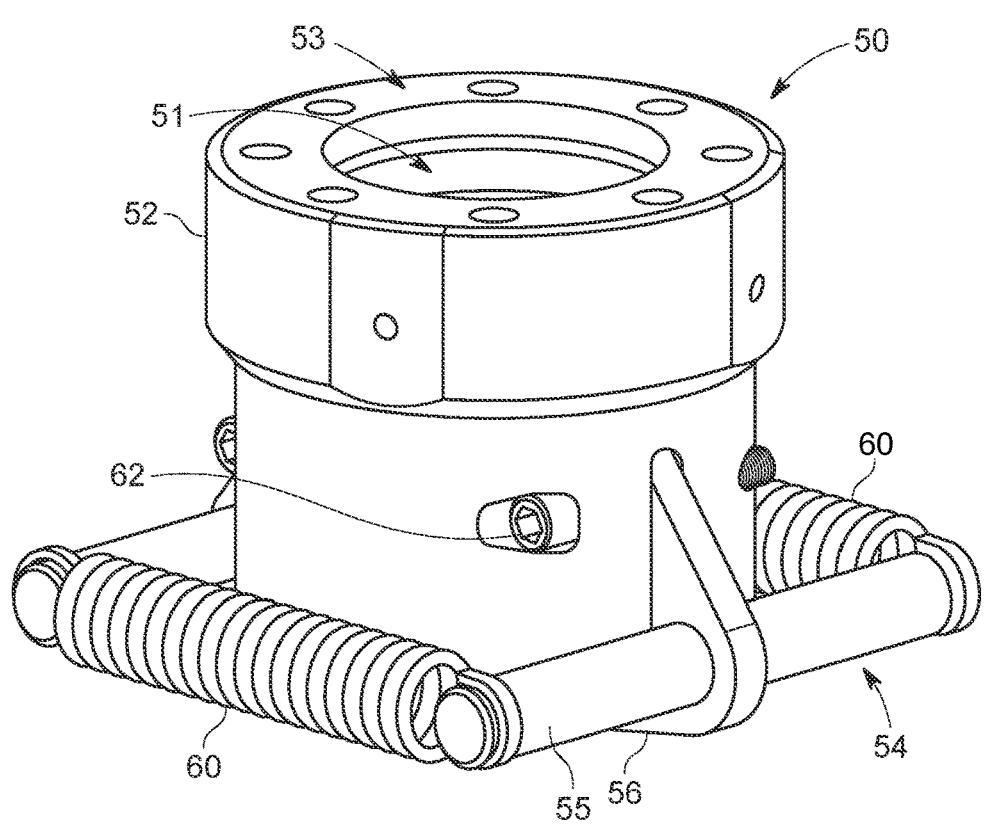
FIG. 5A is a perspective view of a passive locking chuck for a rotary driver according to various other embodiments.
Figure 5B:
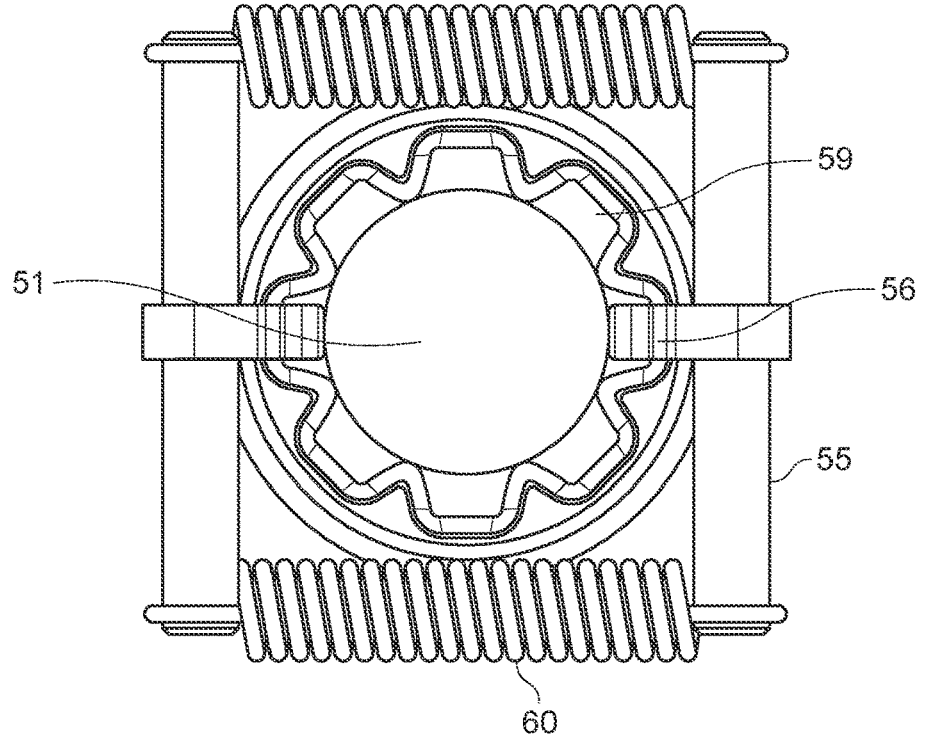
FIG. 5B is a bottom view of a passive locking chuck for a rotary driver according to various other embodiments.
Figure 6A:
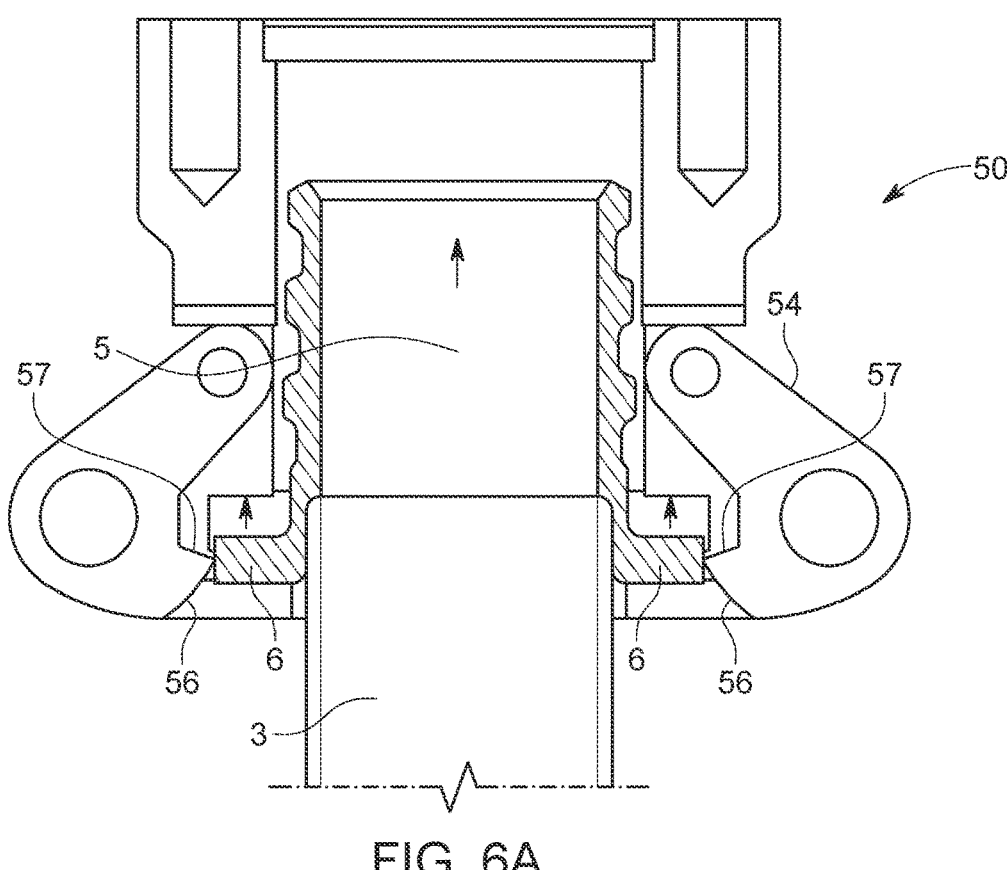
FIG. 6A is a partial cutaway view of a passive locking chuck and screw anchor foundation component as the com-ponent is being inserted into the passive locking chuck according to various embodiments.
Figure 6B:
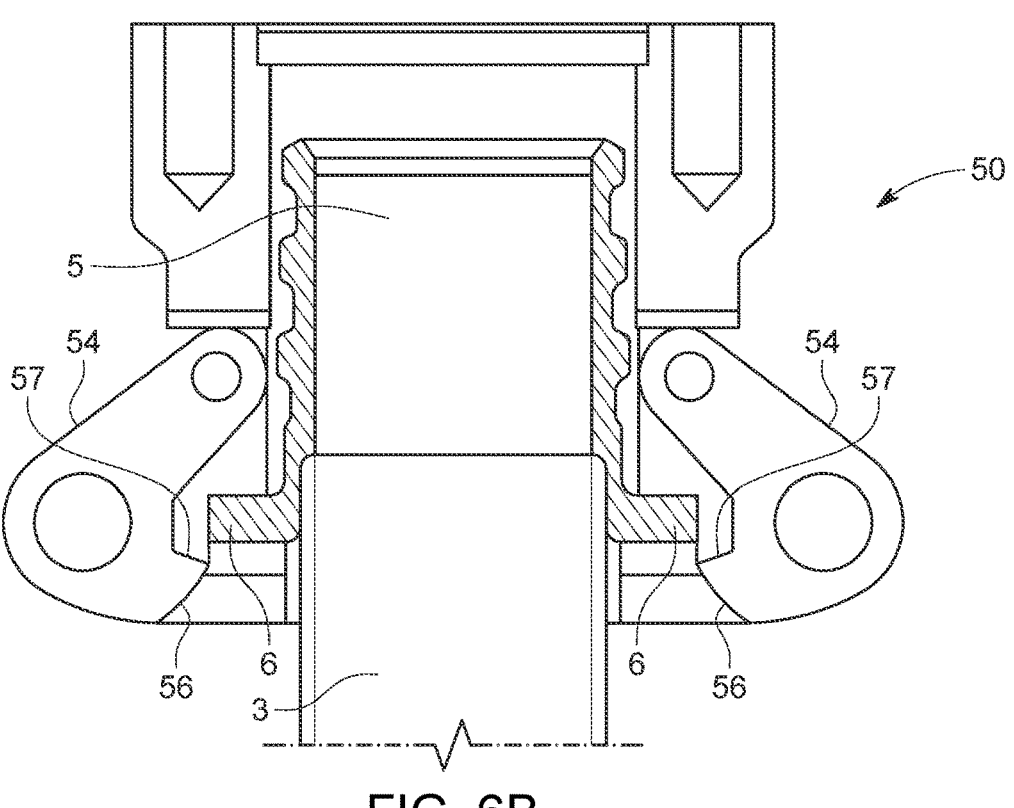
FIG. 6B is a partial cutaway view of a passive locking chuck and screw anchor foundation component after the component is seated in the passive locking chuck.

FIG. 4 is a partially exploded view showing the individual elements of passive locking chuck 30. As shown, main body 32 is a single piece. Pawls 34 are hinged to main body 32 by inserting them into one of the slots "S" formed in the main body and passing bolt 42 through the body and hinge point 38. Then, a pair of springs 40 are captured around hooks 35 to bias the pawls in the closed position. As a screw anchor is loaded, ring 6 presses against displacement portion 36, causing the pawl to pivot outward against the resistance of springs 40 until ledge 37 is cleared, enabling the springs to return a more relaxed position. Springs 40 and/or pawls 34 may be easily replaced if damaged or for routine maintenance/reconditioning by removing bolts 42 from body 32.

Turning now to FIGS. 5A, 5B, 6A and 6B, these figures show another passive locking chuck according to various other embodiments of the disclosure. Passive locking chuck 50 is similar in geometry to chuck 30 shown in the preceding figures. It has main body portion 52 with connecting portion 53 at the top end and an opening 51 passing from the upper end to the lower end. The lower end has a plurality of notches 59 distributed evenly around the opening. Notches 59 are dimensioned to receive a ring of driving features on the driving coupler of the screw anchor, such as ring 6 of anchor 2 shown in FIG. 2A. A pair of spring biased pawls 54 are hingedly attached to main body 52 via a pair of bolts 62 that pass through the main body and opening 58 formed in each pawl 54. In various embodiments, openings 58 may have threaded walls that engage threads formed on the lower portion of bolts 62. Springs 60 extend from the ends of shafts 55 of each pawl 54. As shown, shafts 55 extend to or just beyond the diameter of main body 52 providing clearance between springs 60 and the main body. This may make it easier to clean and dislodge rocks, mud or other debris that may become entangled with the chuck during use. Otherwise, operation of chuck 50 is the same as chuck 30. This is illustrated most clearly in FIGS. 6A and 6B which, show a screw anchor being inserted into chuck 50. When a screw anchor, such as anchor 2, is inserted into the lower opening of chuck 50, ring 6 engages displacement portions 56 of pawls 54, pushing them out of the way against the resistance of springs 60 as the teeth of ring 6 enter notches 59. Once ring 6 has cleared ledge 57, springs 60 relax to their least biased position while ledge 57 holds coupler 5, and by extension screw anchor 2, within chuck 50 until sufficient force is applied to push ring 6 against ledge 57 to stretch springs 60 far enough to allow the ring to pass through. This is difficult to accomplish manually and will not happen under the weight of the anchor alone but is easily accomplished by the machine mast and/or crowd under hydraulic actuation.

Figure 7:
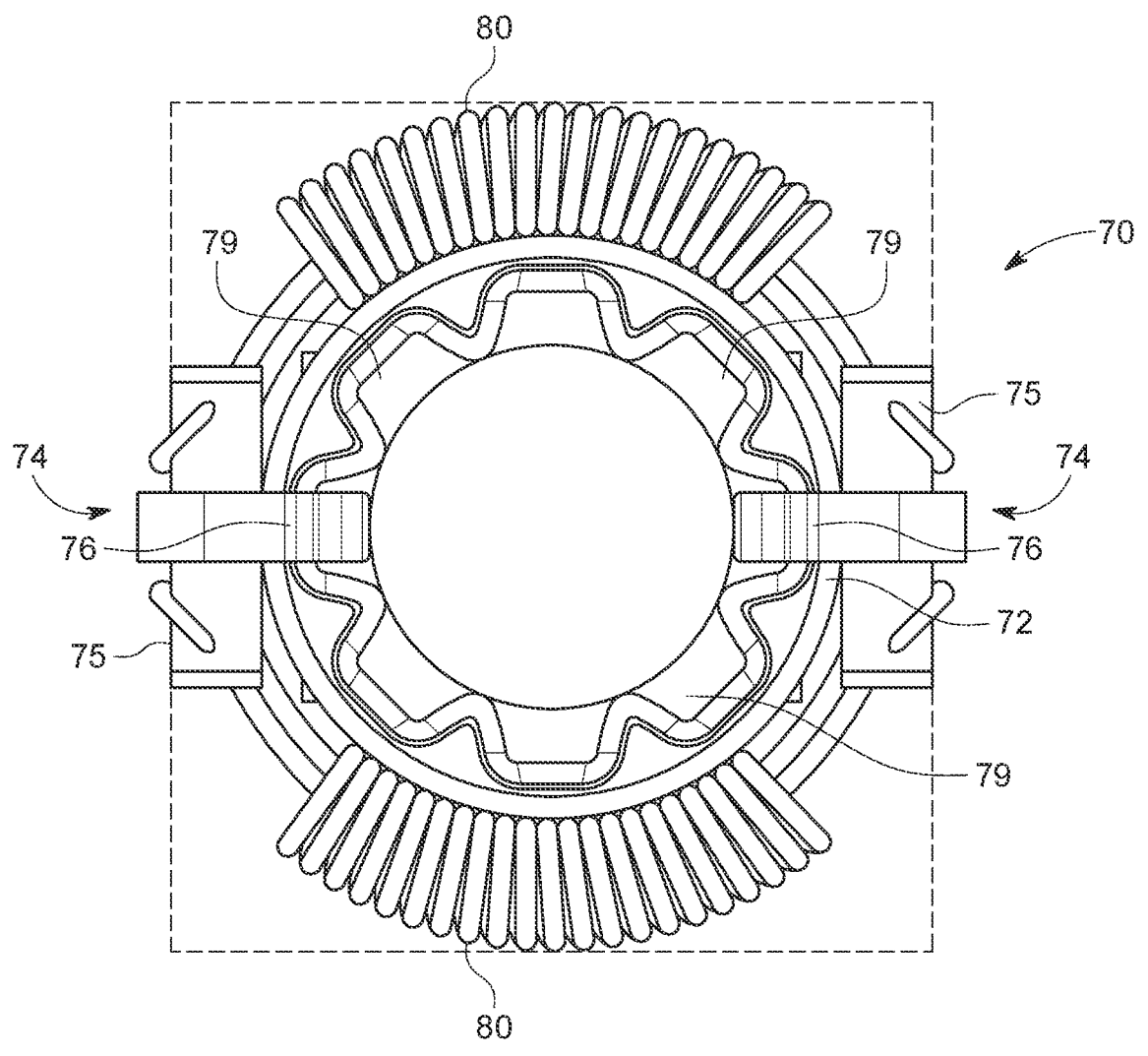
FIG. 7 is a bottom view of another passive locking chuck for a rotary driver according to various embodiments.

Turning to FIG. 7, in some instances, the square cross-sectional footprint of chuck 50 may spatially interfere with other mast components (target assembly, hydraulic lines, centralizer, etc.), in particular, at the corners. FIG. 7 shows passive locking chuck 70 according to various other embodiments of the disclosure. Chuck 70 is a modified version of chuck 50 where rods 75 of pawls 74 have been shortened relative to those of chuck 50 so that springs 80 may stretch around the main body 72 of chuck 70. This frees up space in the corners shown by dotted lines in the figure relative to chuck 50. In various embodiments, though not shown, rods 75 may have indentations or other features to capture the ends of springs 80 to hold them in place. Operation of chuck 70 is otherwise the same as chuck 30 or chuck 50. That is, as the driving end of a screw anchor is inserted into the lower opening shown in FIG. 7, the teeth of ring 6 fit within recesses 79. Displacement portions 76 of pawls 74 are pushed out of place, causing them to pivot outward and to stretch springs 80, until the ledge formed in the pawls is cleared. Release of screw anchor 2 occurs in the same manner, by applying an axial force large enough to enable ring 6 to push against the displacement portions 76 until the springs have been stretched out far enough to enable the ring to clear.

Figure 8A:
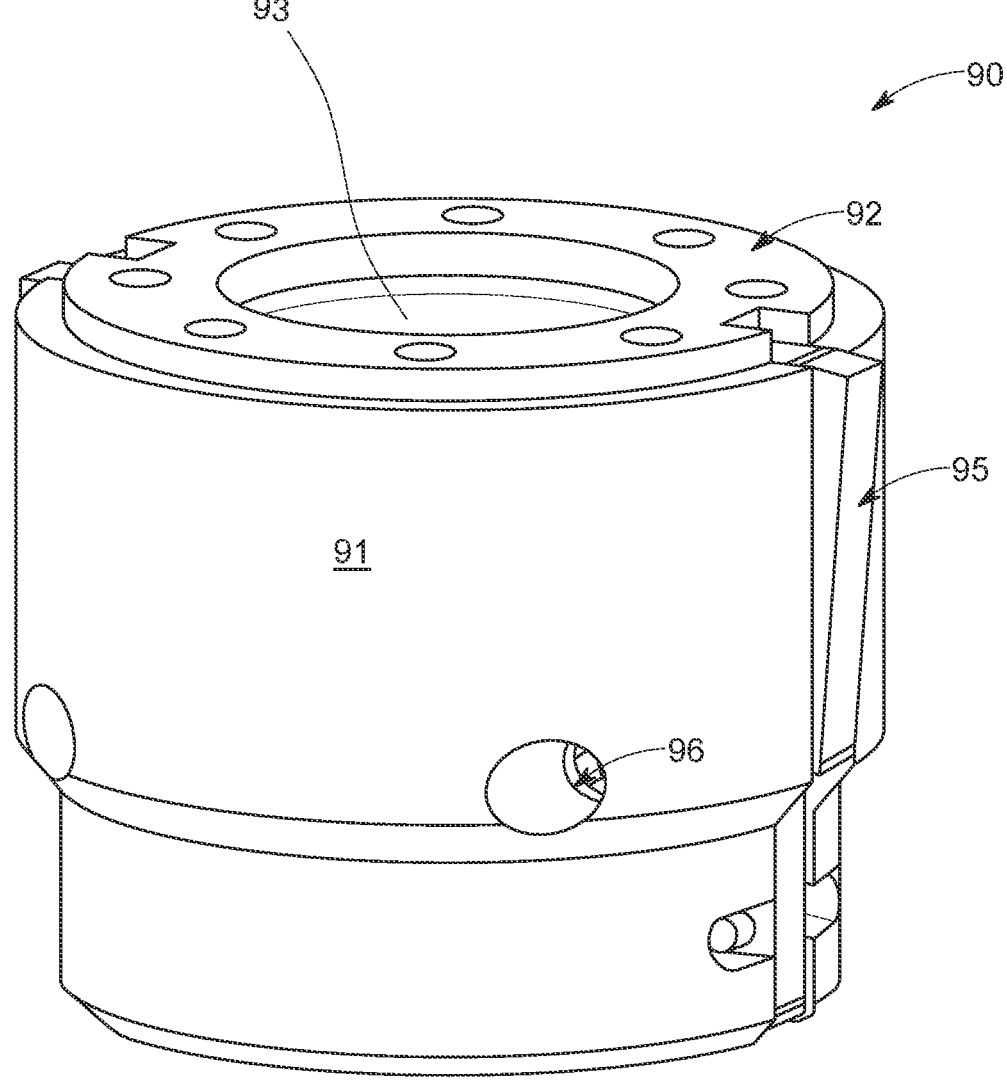
FIG. 8A is a perspective view of a passive locking chuck for a rotary driver according to various other embodiments.
Figure 8B:
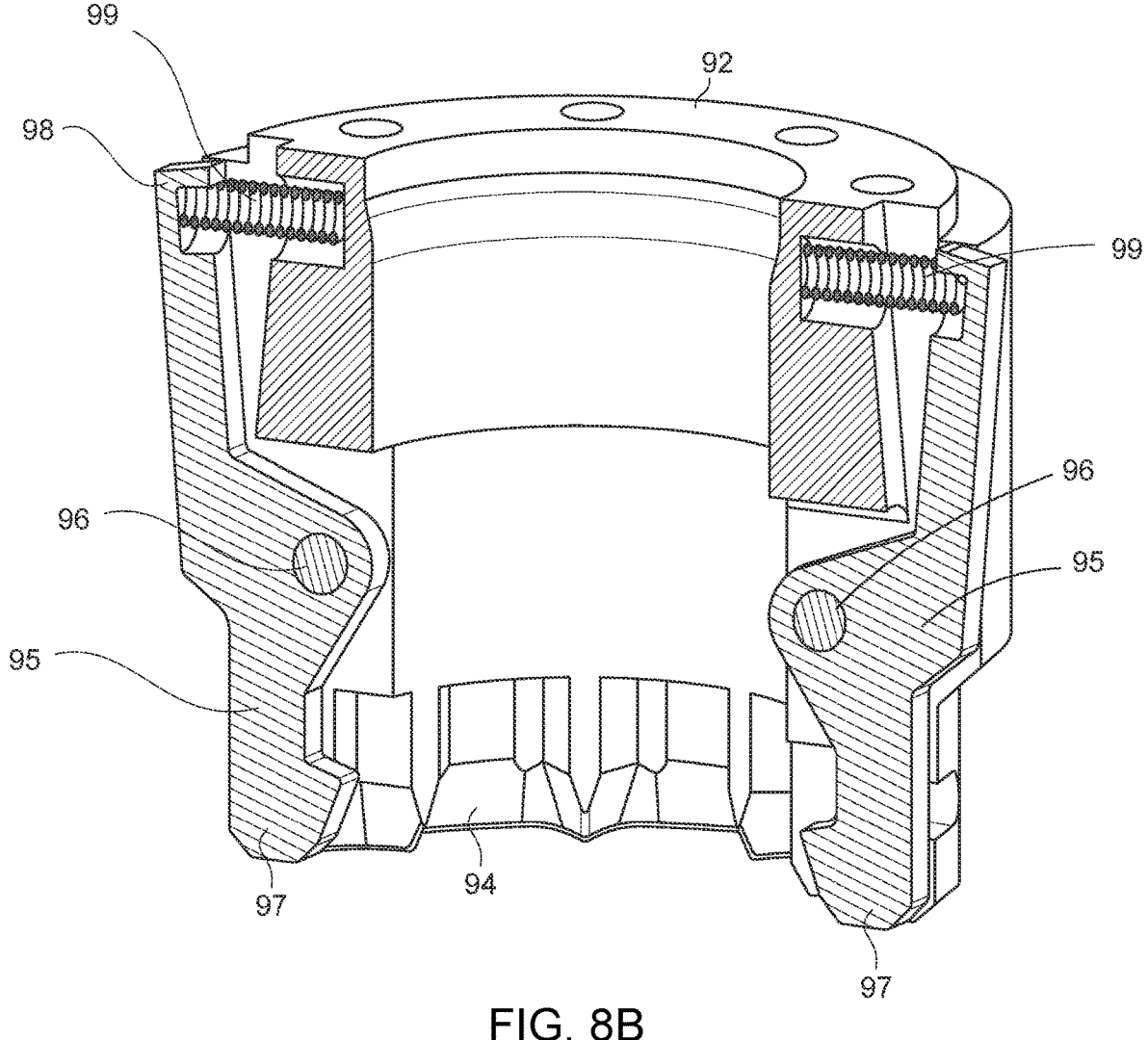
FIG. 8B is a partial cut-away view of the passive locking chuck for a rotary driver shown in FIG. 8A.

Turning now to FIGS. 8A and 8B, these figures show another passive locking chuck, chuck 90, according to various other embodiments of the invention. Chuck 90 has main body portions 91 with upper connecting portion 92 similar to other passive locking chucks shown herein. Opening 93 passive through main body 91 from the upper end to the lower end. A pair of spring biased pawls 95 rest in the outer wall of main body 91. Each pawl 95 is attached to main body 91 via hinge pin 96. Opposing springs 99 bias upper ends 98 outward, pushing lower displacement portions 97 in toward respective ones of recesses 94 formed in the lower end of main body 91. Unlike the passive locking chuck according to other embodiments, springs 9 are concealed within main body 99. This may keep dirt and other debris from clogging springs 99, reducing required maintenance. Use of chuck 90 is otherwise identical to that of the passive locking chucks according to other embodiments disclosed herein. That is, chuck 90 is loaded by inserting the driving end of a foundation component such as screw anchor 2 into the lower open end so that the teeth of ring 6 align with recesses 94. Displacement portions 97 of pawls 95 are displaced out of their respective recesses by the insertion force of the foundation component, causing them to pivot about screws 96 and to compress respective springs 99 until the bottom of ring 6 clears displacement portion 97 of each pawl. Then, screw anchor 2 is held in place while the machine mast is oriented to the correct driving vector and driven into the ground. When driving is completed, the rotary driver may be retracted up the mast, causing pawls 95 to again be displaced as ring 6 displaces portions 97 under the force of the hydraulic motor pulling the rotary driver up the mast. The embedded component is able to easily resist the relatively larger force required to disengage the passive locking chuck from the driving ring of the driven foundation component.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A chuck for a rotary driver comprising:

a main body;

a mounting portion at one end of the main body for attaching to an output of a rotary driver;

a receiving portion at an opposing end of the main body for receiving a driving end of a foundation component, the receiving portion comprising a notched opening; and a pair of spring pawls on the receiving portion, each spring pawl having a displacement surface terminating in a ledge, wherein the displacement surfaces are spring biased into the notched opening, and wherein the pair of spring pawls resist receiving the driving end of the foundation component with a first force, and resist releasing the foundation component with a second, greater force.

2. The chuck according to claim 1, wherein the displacement surfaces are displaced out of the notched opening by the driving end of the foundation component when the driving end is received in the notched opening until the ledge is cleared.

3. The chuck according to claim 2, wherein the displacement surfaces are displaced out of the notched opening by a driving ring formed on the driving end until the ring clears the ledge.

4. The chuck according to claim 1, wherein the pair of spring pawls surround opposing sides of the receiving portion and are interconnected at each respective end of the pair of spring pawls by respective springs.

5. The chuck according to claim 1, further comprising a pair of bolts passing through the main body.

6. The chuck according to claim 5, wherein each bolt passes through a portion of one of the spring pawls to enable the spring pawls to hinge about the bolt against tension formed by respective springs.

7. The chuck according to claim 1, wherein the driving end of the foundation component bears against the displacement surfaces when the foundation component is inserted into the chuck, the pair of spring pawls resisting insertion with the first force.

8. The chuck according to claim 1, wherein the foundation component bears against the ledge when the foundation component is being removed from the chuck, the pair of spring pawls resisting separation with the second force.

9. The chuck according to claim 1, wherein the notched opening is dimensioned to receive driving features on the driving end of the foundation component.

10. The chuck according to claim 1, wherein the driving end of the foundation component, when fully inserted into the chuck, sits against the ledge for each spring pawl.

11. The chuck according to claim 1, wherein a geometry of the displacement surfaces dictates that a direction of downward force is not aligned with a direction of spring displacement.

12. The chuck according to claim 1, wherein the pair of spring pawls is interconnected by a pair of opposing springs that circumscribe portions of the receiving portion.

13. The chuck according to claim 1, wherein the notched opening comprises a plurality of notches.

14. The chuck according to claim 13, wherein the displacement surface extends into one of the plurality of notches.

15. The chuck according to claim 1, wherein each spring pawl includes a spring inside the main body that is compressed when the spring pawl is displaced.

16. The chuck according to claim 1, wherein movement of a spring pawl, from the pair of spring pawls, by pressure against the displacement surface is resisted by the first force and movement of the spring pawl by pressure against the ledge is resisted by the second force.

* * * * *